United States Patent [19]
Marra et al.

[11] Patent Number: 5,815,739
[45] Date of Patent: Sep. 29, 1998

[54] CAMERA ASSEMBLY WITH QUILL DRIVEKEY FOR ENGAGING FILM CARTRIDGE

[75] Inventors: Stephen D. Marra, Fairport; Duane B. Kirk, Hilton; Joseph A. Watkins, Rochester, all of N.Y.

[73] Assignee: Eastman Kodak Company, Rochester, N.Y.

[21] Appl. No.: 837,632

[22] Filed: Apr. 21, 1997

[51] Int. Cl.⁶ ............................. B03B 17/02; B03B 17/26
[52] U.S. Cl. ............................. 396/6; 396/512; 242/348.3
[58] Field of Search .................... 396/6, 429, 512, 396/513, 516; 53/430, 116, 118, 119; 242/348.3, 564, 562.1

[56] References Cited

U.S. PATENT DOCUMENTS

| | | |
|---|---|---|
| 4,972,649 | 11/1990 | Mochida et al. . |
| 5,125,630 | 6/1992 | Hoyt et al. . |
| 5,311,231 | 5/1994 | Suzuki et al. . |
| 5,608,482 | 3/1997 | Watkins et al. . |

FOREIGN PATENT DOCUMENTS

| | | |
|---|---|---|
| 0743 546 A1 | 11/1996 | European Pat. Off. . |
| 6-295022 | 10/1994 | Japan . |
| 7-5526 | 1/1995 | Japan . |
| 8-171180 | 7/1996 | Japan . |

OTHER PUBLICATIONS

U.S. Patent Application Serial No. 08/796,155, filed 6 Feb. 1997.

*Primary Examiner*—Howard B. Blankenship
*Attorney, Agent, or Firm*—Robert Luke Walker

[57] ABSTRACT

A method and apparatus for loading a cartridge in a camera frame assembly. In the method, a frame assembly is provided that includes a frame having a cartridge chamber, a supply chamber, and an intermediate section between the chambers. The frame assembly includes a thumbwheel attached in freely rotatable relation to the frame. The thumbwheel has a rotation member disposed external to the cartridge chamber and a drivekey extends axially into the cartridge chamber. A film cartridge is positioned in the cartridge chamber in close axial proximity to the thumbwheel drivekey. The film cartridge includes a spool and a filmstrip. The spool has opposed first and second ends. Each end has a spool engagement portion. The spool engagement portion of the first end is complementary in shape to the thumbwheel drivekey. The filmstrip has leading, main and tail portions. A quill drivekey is placed in close axial proximity to the second end of the spool. The quill drivekey is complementary in shape to the spool engagement portion of the second end. The thumbwheel is clamped. The quill drivekey is rotated. During the rotating, the quill drivekey is urged axially toward the cartridge, which is urged toward the thumbwheel drivekey, until both drivekeys mate engagingly with respective engagement portions.

14 Claims, 16 Drawing Sheets

CAMERA ASSEMBLY WITH QUILL DRIVEKEY FOR ENGAGING FILM CARTRIDGE

CROSS REFERENCE TO RELATED APPLICATIONS

Reference is made to commonly assigned, co-pending U.S. patent application Ser. No. 08/840482 entitled CAMERA ASSEMBLY METHODS AND APPARATUS, filed concurrently with this application in the names of Watkins et al.

FIELD OF THE INVENTION

The invention relates to photographic equipment and more particularly relates to method and apparatus for loading a cartridge in a camera frame assembly.

BACKGROUND OF THE INVENTION

Single use cameras are commonly sold preloaded with a cartridge of film. In order reduce complexity and costs, a rewind mechanism is omitted from the camera. Instead, the film is prewound and during use is advanced back into the film canister. A number of approaches have been followed in loading and prewinding film cartridges for single use cameras. In some approaches, such as one taught in U.S. Pat. No. 4,972,649; film is prewound into a roll outside the camera body and then loaded. A shortcoming of these approaches is that the film roll must be handled after it is formed. This presents a risk of film damage and may add complexity to necessary equipment. In some other approaches, also taught in U.S. Pat. No. 4,972,649; the cartridge is loaded, the camera is light-tightly closed, and the film is then prewound. In still other approaches, such as taught by U.S. Pat. No. 5,311,231; the cartridge is loaded and then the rear opening of the camera body is closed and the film is prewound through a bottom opening, which is later sealed. The latter two approaches have the shortcoming that film guiding is provided primarily by the camera body, rather than loading apparatus. This places constraints on the camera body in terms of required tolerances and the like and may, in addition, slow throughput speeds. Still another approach is taught by Japanese Kokai 6-295022, European Patent Application No. 0743546-A, and Japanese Kokai 8-171180. In this approach, the film is wound onto a second spool, rather than being wound into a film roll. The back of the camera is not mandatory for guiding the film, since the second spool tends to restrain the film.

As a part of assembling a single use camera, a cartridge needs to be seated against some kind of film drive mechanism. This is problematic if the filmstrip in the cartridge is to be prewound after the cartridge is seated in a camera frame assembly, since the camera film drive mechanism is made to drive the film in the opposite direction.

It is desirable to provide an apparatus and method in which a cartridge can be seated by automatic machinery against a prepositioned thumbwheel.

SUMMARY OF THE INVENTION

The invention is defined by the claims. The invention, in its broader aspects, provides a method and apparatus for loading a cartridge in a camera frame assembly. In the method, a frame assembly is provided that includes a frame having a cartridge chamber, a supply chamber, and an intermediate section between the chambers. The frame assembly includes a thumbwheel attached in freely rotatable relation to the frame. The thumbwheel has a rotation member disposed external to the cartridge chamber and a drivekey extends axially into the cartridge chamber. A film cartridge is positioned in the cartridge chamber in close axial proximity to the thumbwheel drivekey. The film cartridge includes a spool and a filmstrip. The spool has opposed first and second ends. Each end has a spool engagement portion. The spool engagement portion of the first end is complementary in shape to the thumbwheel drivekey. The filmstrip has leading, main and tail portions. A quill drivekey is placed in close axial proximity to the second end of the spool. The quill drivekey is complementary in shape to the spool engagement portion of the second end. The thumbwheel is clamped. The quill drivekey is rotated. During the rotating, the quill drivekey is urged axially toward the cartridge, which is urged toward the thumbwheel drivekey, until both drivekeys mate engagingly with respective engagement portions.

It is an advantageous effect of at least some of the embodiments of the invention that camera assembly methods and apparatus are provided in which a cartridge can be seated by automatic machinery against a prepositioned thumbwheel.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
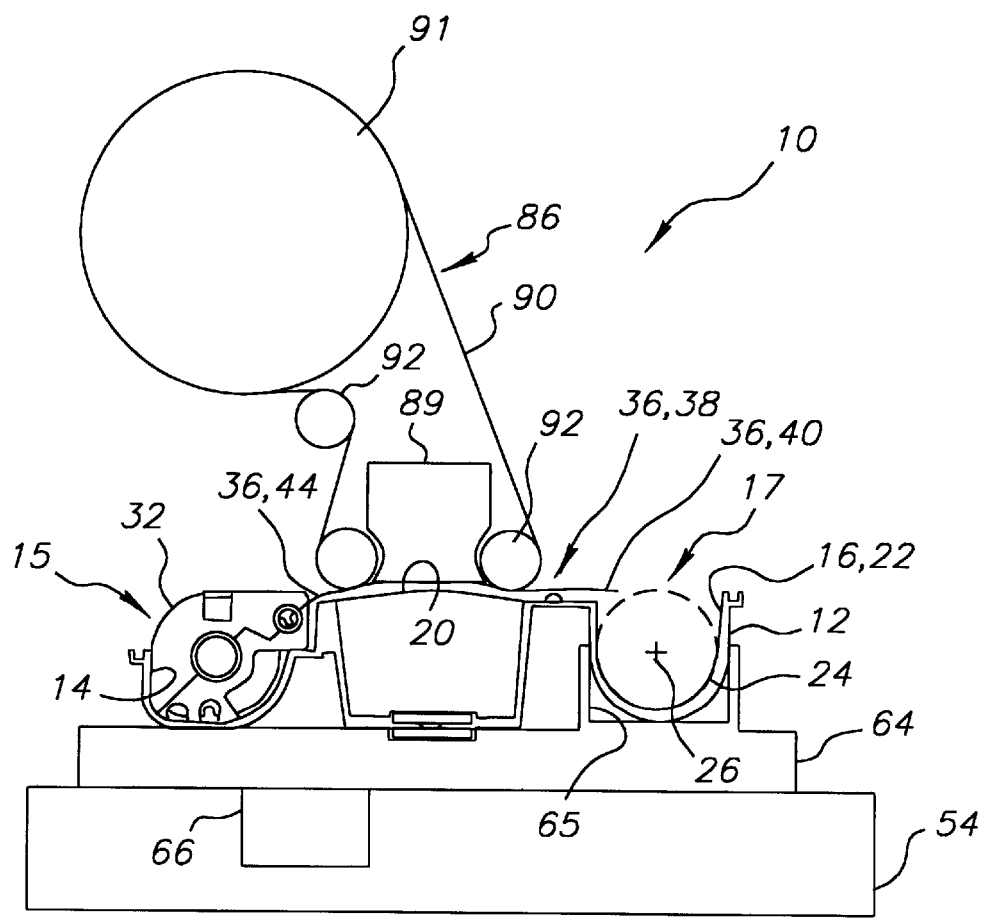
FIG. 1 is a semi-diagrammatical view of a station of an embodiment of the apparatus of the invention, showing a receiver and film bridge. A pallet rests on the receiver. The pallet bears a camera frame assembly (shown in cross-section) and a cartridge. The film space is indicated by dashed lines. The film space axis is indicated by a cross. The invention is not limited to a particular camera frame assembly and various alternative camera frame assemblies are illustrated in the figures.

In the apparatus and method of the invention, film is prewound in a camera frame assembly 10, that is, a camera or incomplete camera subunit, in a darkroom. The camera frame assembly 10 includes a camera frame 12 having a cartridge chamber 14 and a supply chamber or scroll chamber 16. The cartridge and supply chambers 14,16 each have a rearwardly facing throat or opening 15,17, respectively. The supply chamber 16 has one or two side openings 18 that are continuous with the throat 17. The camera frame 12 has an intermediate section or exposure frame 20 between the chambers 14,16. The supply chamber 16 has a concave interior wall 22 that defines a substantially cylindrical, internal film space 24 having a film space axis 26. The frame assembly 10 lacks a film spool or other axial film support, thus the film space 24 is empty, and remains empty except for the film roll. The frame assembly 10 defines a rear opening or rear accessway (indicated by dashed line 28 in FIG. 2) over the supply chamber and, preferably over both chambers 14,16 and the intermediate section 20.

The film cartridge 30 loaded into the frame assembly 10 includes a canister 32, a spool 34, and a filmstrip 36. The filmstrip 36 has a leading portion 38 having a free end 40, a tail portion or trailing portion 42, which is attached to the spool 34 in the canister 32, and a main portion 44 between the leading and tail portions 38,42.

The camera frame assembly can also include other camera components which have been previously installed on the camera frame. For example, the camera frame assembly 10 can include an exposure system 46, including one or more sub-components such as a baffle, a lens system, and a shutter. The frame assembly 10 can include a camera film drive 48 having a film engagement member (indicated diagrammatically in FIG. 2 by a semicircle 50) which adjoins the intermediate section 20 and engages film perforations (not shown) for film metering or both film metering and film transport. A variety of such camera film drives are well known to those of skill in the art. In such drives, the film engagement member can be a linearly reciprocated pawl; however, a sprocket is more commonly used as the film engagement member. In many film drives for type 135 (35 mm.) film, the sprocket is a continuously toothed wheel. The sprocket rotates with film movement; but, at all times, part of the sprocket extends rearward from the intermediate section. In some film drives for APS film, for example, in Japanese Kokai 7-5526, filed Jun. 14, 1993, the film engagement member is a skater or incompletely toothed sprocket in which an oval wheel has a pair of teeth at each end of the long axis and a toothless portion at each end of the short axis. With some film transport mechanisms, such as conventional sprocket types, it is necessary to lift film above the sprocket or other film engagement member during prewinding. With other film transport mechanisms, such as some skater types, the film can move past the skater or other film engagement member without causing it to rotate or otherwise actuate. The apparatus and method of the invention, in different embodiments, can accommodate either type of film transport mechanism.

The apparatus 52 of the invention includes a receiver 54, and active components 56 for cartridge loading, film transporting, and film winding. The method of the invention will be explained in relation to these components. The method of the invention is particularly suitable for prewinding film in one time use cameras; but is also suitable for prewinding reusable cameras marketed ready for use, that is, with a preloaded, prewound film cartridge. In the method of the invention, a film cartridge 30 is loaded into the cartridge chamber 14 of a camera frame assembly 10; and a filmstrip 36, attached at one end to a spool 34 in the cartridge 30, is wound into a film roll 62 in the other film chamber 16. After film rolling, the filmstrip 36 extends from the cartridge 30, across the intermediate section 20 to the supply chamber 16, and the major portion 44 of the filmstrip is a film roll 62 resting in the supply chamber 16.

The method begins with the provision of camera frame assemblies 10. These assemblies can be manufactured as a part of a continuous process with the method of the invention or can be manufactured in an independent process. The camera frame assemblies 10, however prepared, are placed on the receiver 54 of the apparatus 52 of the invention.

Figure 4:
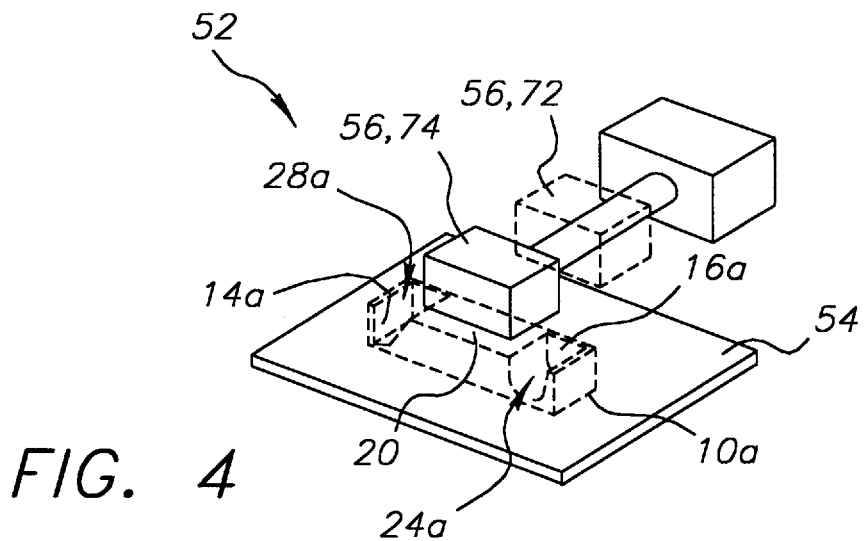
FIG. 4 is a semi-diagrammatical perspective view of an embodiment of the apparatus of the invention.

The receiver 54 supports the camera frame assembly 10 in a predetermined loading position 10a or series of positions 10a relative to the components 56 of the apparatus 52 of the invention. The receiver 54 has a predetermined relationship to the other components 56 and thus, during assembly, defines a predetermined relative location or site for each of the chambers, throats, intermediate section, film space, and rear opening. (Sites correspond to features of the frame assembly and are necessarily predetermined for a particular frame assembly by adjusting physical constraints such as relative positions of the receiver and other components of the apparatus. In FIG. 4, representative sites are indicated in dashed lines and by references numbers identical to those of similarly named frame assembly features, but with the letter "a" added.) The receiver 54 can accept the camera frame assembly 10 directly or can be adapted to accept a pallet or nest 64 or the like. In that case, the camera frame assembly 10 is held in a predetermined relation to the pallet or nest 64, which in turn in held in a predetermined loading orientation by the receiver 54. Indexing features 65 can be provided on the pallet to permit the camera frame assembly 10 and the receiver 54 to be readily aligned. The frame assembly 10 can be provided to the receiver 54 premounted on a pallet or the pallet and frame assembly can combined on the receiver.

The receiver 54 can have a variety of features for supporting automated assembly operations. For example, the apparatus can include a positioner, indicated schematically in FIG. 1 by positioner 66, for moving a camera frame assembly 10 between the apparatus of the invention and one or more other assembly stations or between stations having different components of the apparatus of the invention. As a matter of convenience, the following discussion is generally directed to an apparatus 52, like that shown schematically in FIG. 5, in which components 56 are divided among a series of different stations 68 and the receiver 54 is a movement system conveying the frame assembly 10 from station to station. The apparatus components 56 can each include an actuation mechanism 70. The mechanisms 70 can include a retraction-extension system for moving the respective component between a non-use position 72, in which the component is clear of the receiver, and a use or active position 74. The actuation mechanism can also include other parts for imparting motion to components, such as rotary or linear drives.

After the frame assembly 10 has been placed on the receiver 54, a film cartridge 30 is positioned in the cartridge chamber 14 of the frame assembly 10 and the filmstrip is advanced to the supply chamber 16.

Figure 6:
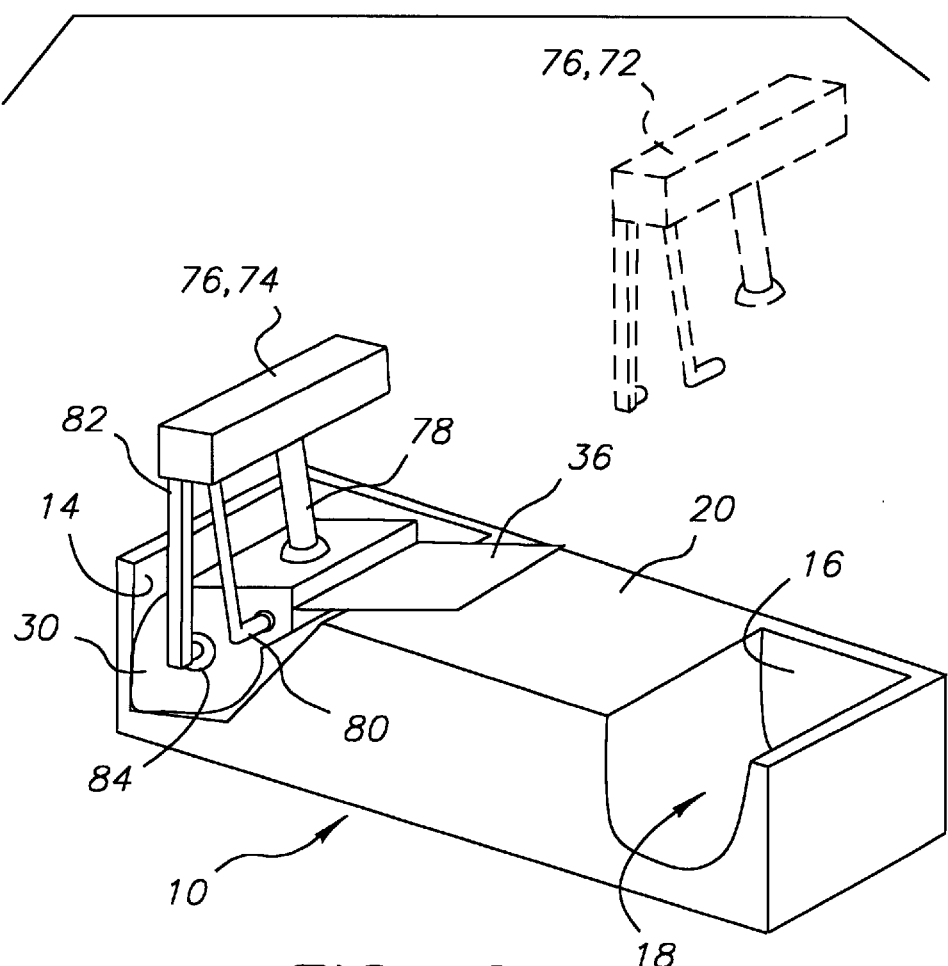
FIG. 6 is a semi-diagrammatical perspective view of a cartridge moving station of an embodiment of the apparatus of the invention.

Referring now an embodiment of the invention shown in FIG. 6, the apparatus 52 include a cartridge mover 76 for positioning the cartridge 30 in the cartridge chamber 14. The cartridge mover 76 has a vacuum gripper 78 which allows the cartridge mover 76 to position the cartridge 30 in the cartridge chamber 14 and, optionally, to continue to grip or constrain the cartridge 30 during film winding. The cartridge 30 can be released after film winding is completed. This is convenient if the camera frame assembly 10 lacks features to prevent oscillation or other movement of the film cartridge 30 during film winding. The cartridge mover 76 can support other components, such as an active light lock opener 80 and a spool rotator 82. The active light lock opener 80 is pivoted to open the active light lock of a suitable film cartridge, such as an Advanced Photo System™ (APS™) cartridge, prior to placement of the cartridge in the cartridge chamber site. This allows the camera frame assembly to include a detent (not shown) which retains the active light lock in the open position during film use. The spool rotator 82 engages the spool 84 of the cartridge 30 and rotates the spool 84 to thrust the filmstrip 36 from the cartridge 30.

Figure 7:
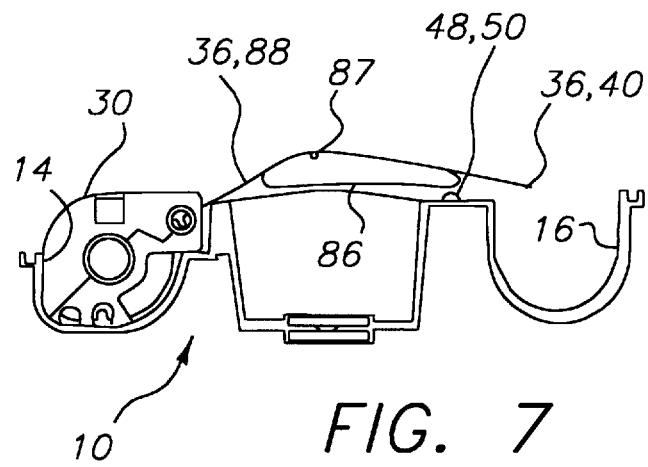
FIG. 7 is a semi-diagrammatical side cross-sectional view of a film transporting station of the embodiment of the apparatus of the invention of FIG. 6.

Referring now to FIGS. 1 and 7, in some embodiments of the invention, a film bridge 86 is next moved, relative to the frame assembly 10, to an active position over the intermediate section 20 of the frame assembly. This can be accomplished in the same station 68 or the frame assembly 10 can be moved to a new station 68 that includes a film bridge 68. The film bridge 86 defines a film path 88 extending from the cartridge chamber 14 to the supply chamber 16. (In FIGS. 1 and 7, the film path 88 is occupied by the filmstrip 36.)

In embodiments in which the frame assembly 10 has a film engagement member 50, such as a conventional sprocket, that continuously extends outward from the intermediate section 20; it is preferred that the film path 88 be spaced apart from the intermediate section site 20*a*, since this separates the filmstrip 36 from the camera film drive, which thus does not need to be disabled or the like during film roll formation. Within these constraints, the film bridge 86 can take a variety of forms. For example, the film bridge 86 can be a turtleback as shown in FIG. 7. It is preferred that the turtleback present minimal friction to the filmstrip. The turtleback can provide one or more friction reducing features (indicated by item 87 in FIG. 7); such as holes and a pressurized gas connection for an air cushion or rotary bearings.

It is highly preferred that the film bridge 86 include a film transport, disposed in operative relation to the film path 88, to propel the filmstrip along the film path to the supply chamber. Examples of film bridges that include a film transport include a capstan drive; a vacuum shuttle, such as that disclosed in U.S. Pat. No. 5,125,630; and an endless belt mechanism. The endless belt can be disposed between the filmstrip and the intermediate section 20 of the camera frame assembly or, as shown in FIG. 1 can overlie the filmstrip 36.

In the latter case, the endless belt mechanism can have holes (not shown) and include a vacuum-compressed gas unit 89 to provide a vacuum and pull the filmstrip against the belt 90 for transport, and direct compressed gas against the filmstrip 36 to release the filmstrip from the belt 90. The mechanism includes a belt drive 91 and idler rollers 92 which position and tension the belt 90.

FIGS. 8–12 illustrate alternative embodiments of the apparatus of the invention which are used with a frame assembly 10*b* that includes a thumbwheel 94 which is mounted to an endwall 96 of the cartridge chamber 14. The thumbwheel 94 is earlier attached (not illustrated) to the frame 12 and, as attached, is free to rotate relative to the frame 12. The thumbwheel 94 has a rotation member 98 which, in the completed camera, is turned to advance film. The thumbwheel 94 has an axially positioned drivekey 100, which extends into the cartridge chamber space 14*b*. A collar or resilient flange or the like (not shown) holds the thumbwheel 94 in place on the frame 12. The thumbwheel drivekey 100 is complementary in shape to an axial cut-out or engagement portion 102 of the spool of either a standard film cartridge or a cartridge with a cut-out of unique shape for use in the specific camera. For use with APS film, the drivekey 100 has the shape shown in FIG. 9 and can mate with the cut-out 102 of the cartridge spool 84 in only a single orientation.

Figure 5:
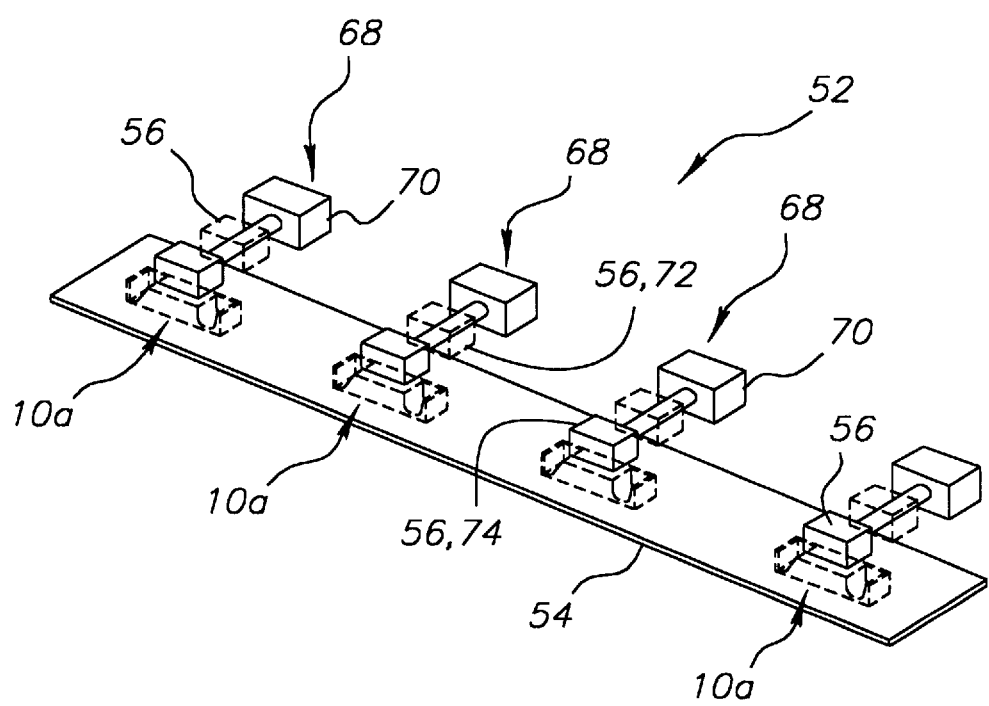
FIG. 5 is a semi-diagrammatical perspective view of another embodiment of the apparatus of the invention.
Figure 8:
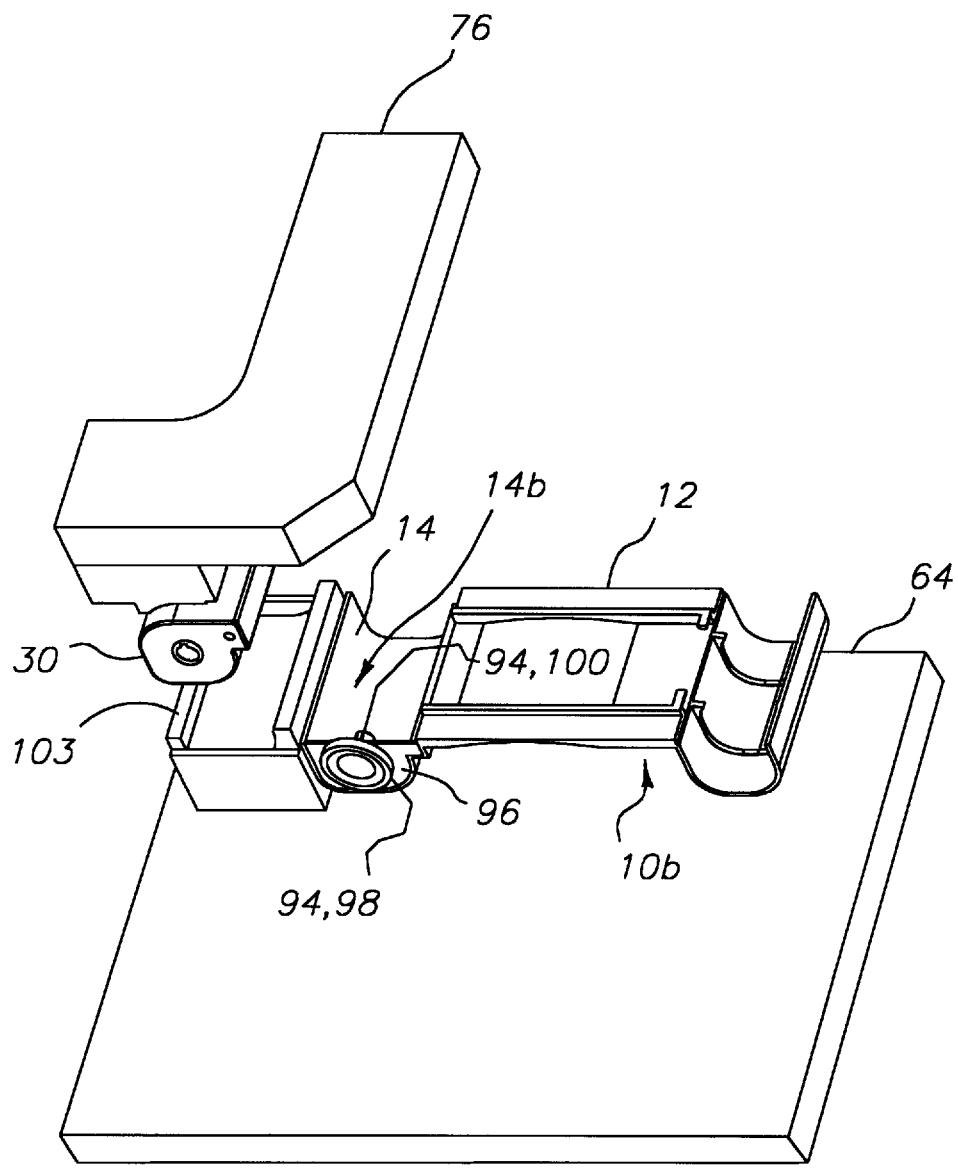
FIG. 8 is a semi-diagrammatical perspective view of a cartridge moving in another embodiment of the apparatus of the invention.

Referring now to FIGS. 5, and 8, in a first station 68, a camera frame assembly is placed on a pallet 64, by a suitable component 56, such as a pick and place device. Referring now to FIG. 8, in the same or a second station 68, a first cartridge mover 76, such as a vacuum gripper, grips an APS or similar film cartridge 30 from a bin or other store (not shown) and places the cartridge 30 within a cartridge nest 103 on the pallet 64. While the cartridge 30 is gripped, an active light lock opener 80 (shown for a different embodiment in FIG. 6) engages and rotates the active light lock 90 degrees to fully open the film exit of the cartridge 30. In the embodiment of FIG. 6, the active light lock opener 80 is illustrated as sharing a common support with the vacuum gripper 76; however, it will be understood that this and other components 56 of the apparatus 52 could be mounted separately or commonly in a wide variety of different ways. In the above discussed embodiment, the apparatus components 56 are next retracted from the frame assembly 10 and the pallet 64 is moved on the receiver 54 to the next station 68.

Figure 9:
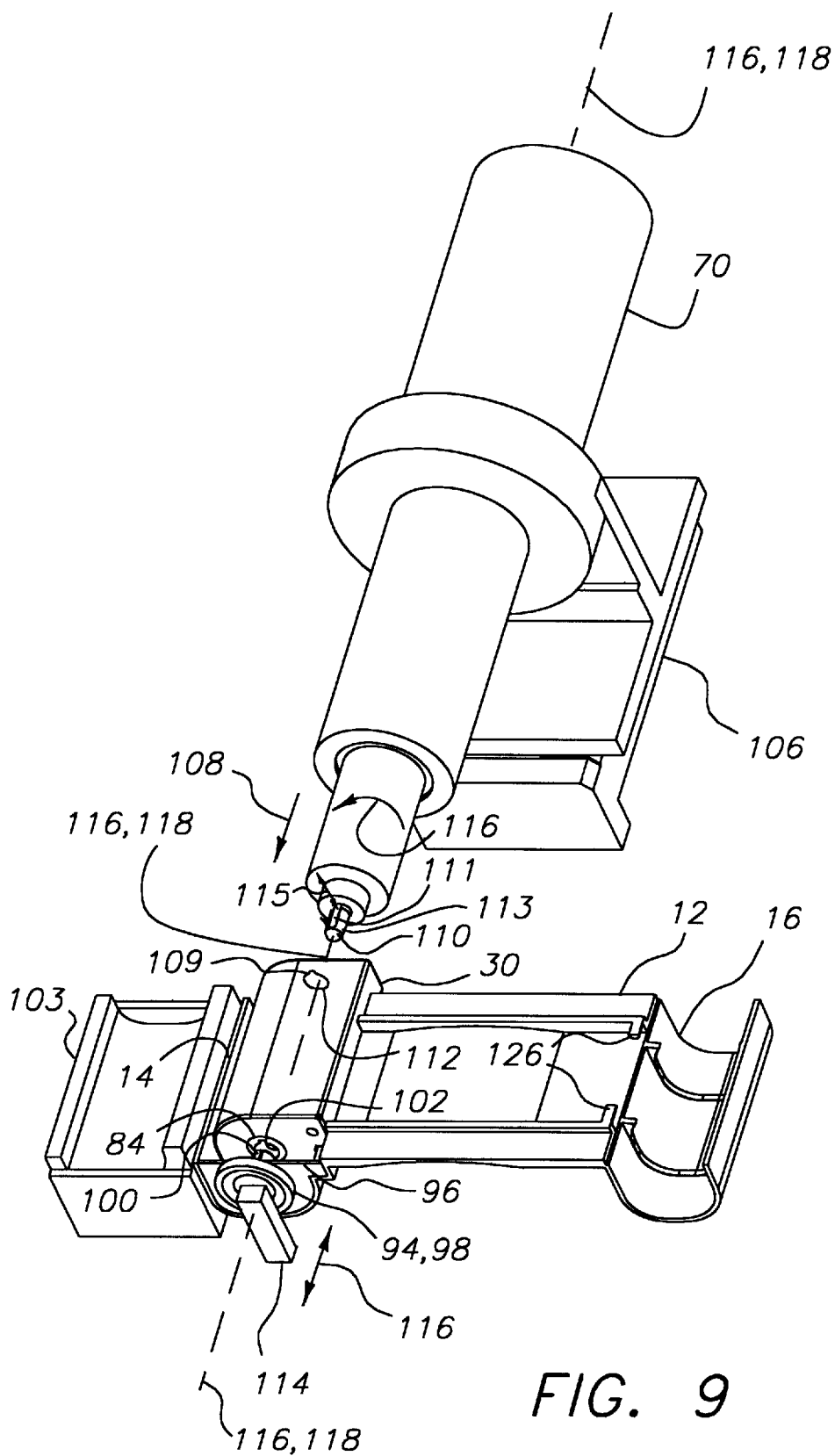
FIG. 9 is the same view as FIG. 8 showing an initial stage of cartridge loading.

Referring to FIGS. 5, 8 and 9, in the same station 68 or a third station 68, a the same or a second cartridge mover 76 grips the cartridge 30 and positions the cartridge 30 in the cartridge chamber 14 in close axial proximity to the drivekey 100 of the thumbwheel 94. The cartridge 30 is not moved so far into the cartridge chamber space 14*b* as to engage the cut-out 102 of the cartridge spool 84 and the thumbwheel drivekey 100. The reason is that in a film cartridge like an APS cartridge, the opening of the cartridge door unlocks the film spool. Thus, the engagement portion 102 and drivekey 100 may be misaligned and it is undesirable to force the parts together. The cartridge mover 76 is withdrawn and the frame assembly 10*b* is moved on to the next station 68.

Figure 10:
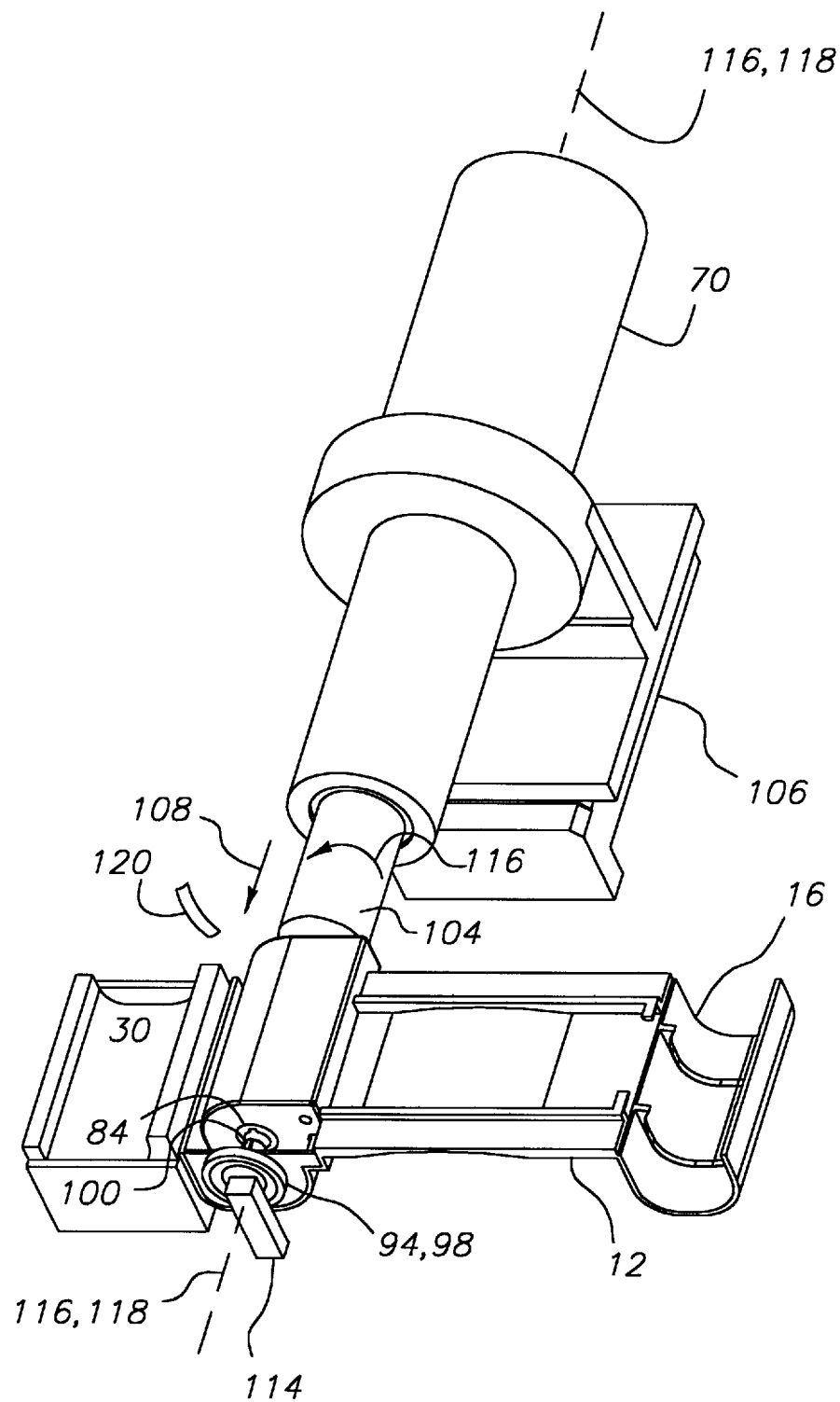
FIG. 10 is the same view as FIG. 8 showing a latter stage of cartridge loading.

Referring now to FIGS. 9–10, in a fourth station, a quill 104 is moved, by a linear actuator 106, in an axial direction (indicated by arrow 108) relative to the spool 84 of the film cartridge 30. The quill 104 has a quill drivekey 110 that is complementary in shape to a second cut-out or engagement portion 112 (indicated by dashed lines in FIG. 9) of the cartridge spool 84. The cut-outs 102,112 at opposite ends of the cartridge spool 84 may have the same shape or may differ. A clamping member 114 is moved, as indicated in FIG. 9 by two-headed arrow 116, from a non-use position spaced from the supply chamber site 14a to a use position in which the clamping member 114 bears against the thumbwheel 98, which clamps the thumbwheel 98 and prevents rotation of the thumbwheel 98 relative to the frame 12. A light axial load (supplied by actuation device 106) on the quill 104, urges the quill 104 against the cartridge spool 84, and the cartridge spool 84 against the drivekey 100 of the thumbwheel 94. At the same time, the quill 104 is rotated by actuation device 70 in a backward direction (indicated by arrow 116); that is, the quill 104 is rotated in a direction of rotation that, if applied to the cartridge, would withdraw an extended filmstrip back into the cartridge. This is the rewind direction for the film cartridge, that is, the direction the spool is rotated to rewind film back into the cartridge. With a thrust type film cartridge, this direction is also opposite to that of film thrusting. The rotation of the quill 104 causes one, and then another, of the drivekeys 100,110 and respective cut-outs 102,112 to be aligned within two revolutions of the quill 104. When the first cut-out 102 of the spool 84 and the thumbwheel drivekey 100 are aligned, the cartridge 30 moves axially (generally in the direction indicated by arrow 108) under the force applied by the quill 104, relative to common thumbwheel and cartridge axes 116,118, until the first cut-out 102 has moved into mating engagement with the thumbwheel drivekey 100 and the cartridge is seated against the thumbwheel 94 and endwall 96. Similarly, when the second cut-out 112 of the spool 84 and the quill drivekey 110 are aligned, the drivekey 110 moves axially into the second cut-out 112. The drivekey 110 of the quill 104 can be spring-loaded to moderate the force applied by the quill 104 and prevent possible jamming, during quill movement prior to mating engagement of both pair of cut-outs 102,112 and drivekeys 100,110. After the cartridge has been seated, the clamping member is retracted from the thumbwheel. The spring loading can be axial only or can provide both for resilience in an axial direction and in one or more other directions to accommodate possible misalignments of the quill and the cartridge and thumbwheel axes.

In a particular embodiment of the invention, the second spool cut out 112 is circular or similarly radially symmetrical except for a radial slot 109. In that embodiment, the quill drivekey 110 includes a detent or key member 111 that is configured to fit in the slot 109. The key member 111 is movable independent of the body 113 of the drivekey 110 in directions (indicated by arrow 115) substantially radial to the axis of rotation of the quill and is resiliently biased outward. The key member 111 allows the quill drivekey to enter the cut out 112 while radially misaligned. The quill drivekey 110 can then spin within the cut out 112 until the key member 111 becomes aligned and resiliently moves into the cut out 112.

The discussion here is primarily directed to an embodiment of the invention using an APS cartridge; however, this procedure is applicable to both thrust-type film cartridges, such as APS cartridges, and non-thrust type cartridges, such as type 135 cartridges. In the latter case care must be taken to avoid withdrawing all the leader into the cartridge during cartridge seating.

A detector 120 can be mounted in operative relation to the cartridge chamber space 14a to sense axial motion of the cartridge 30, or the like. The detector 120 can be integrated into a control system, which can stop the operation and withdraw the quill if a fault condition is detected.

Figure 13:
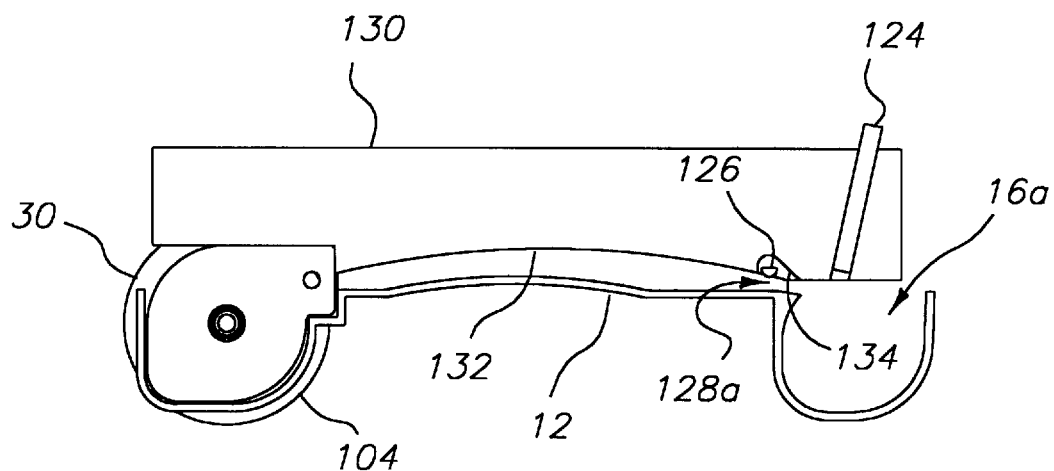
FIG. 13 is a semi-diagrammatical vertical cross-section of film guiding member of FIG. 12 in place on a camera frame assembly.
Figure 11:
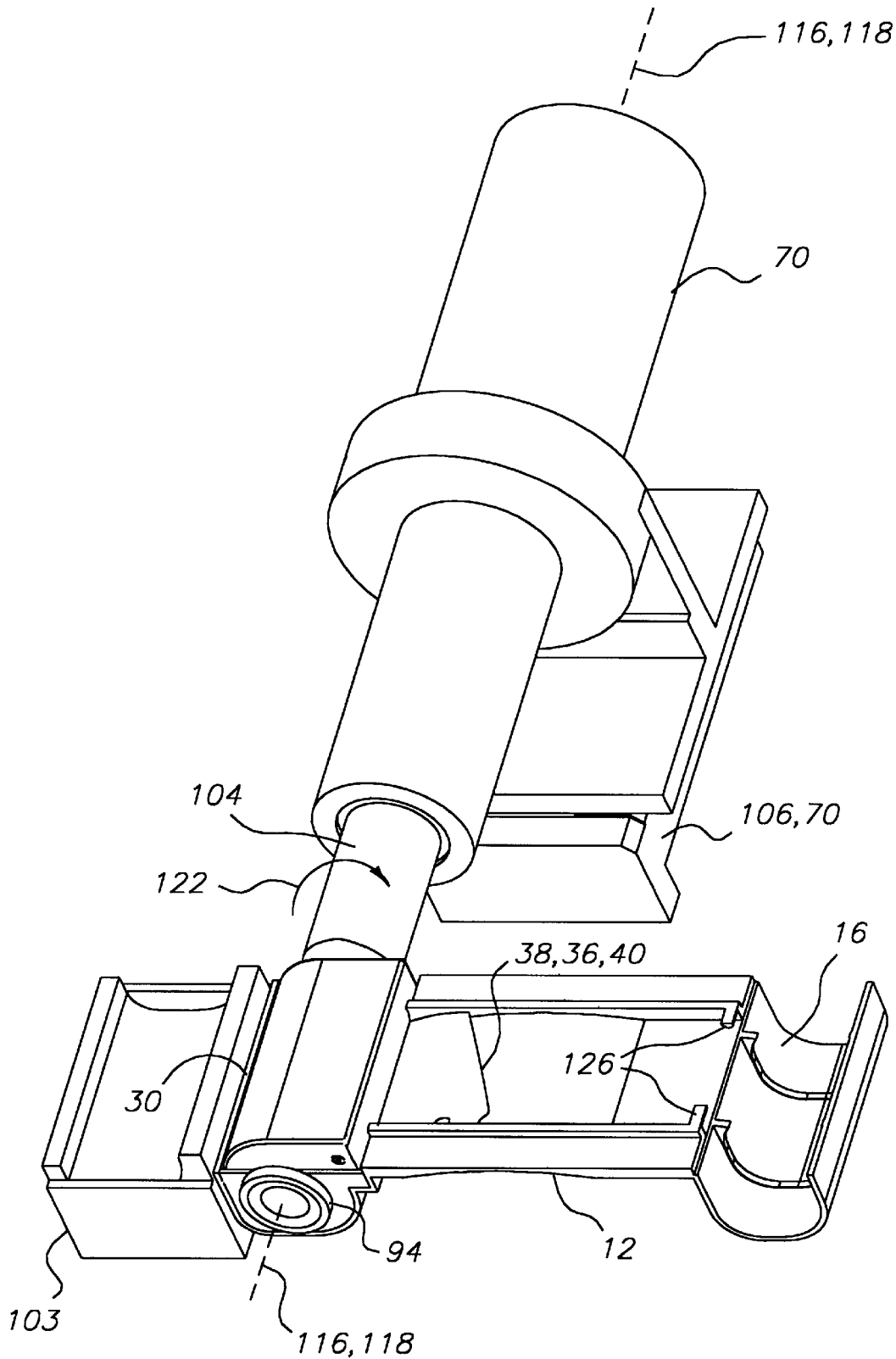
FIG. 11 is the same view as FIG. 8 showing film advancing.
Figure 12:
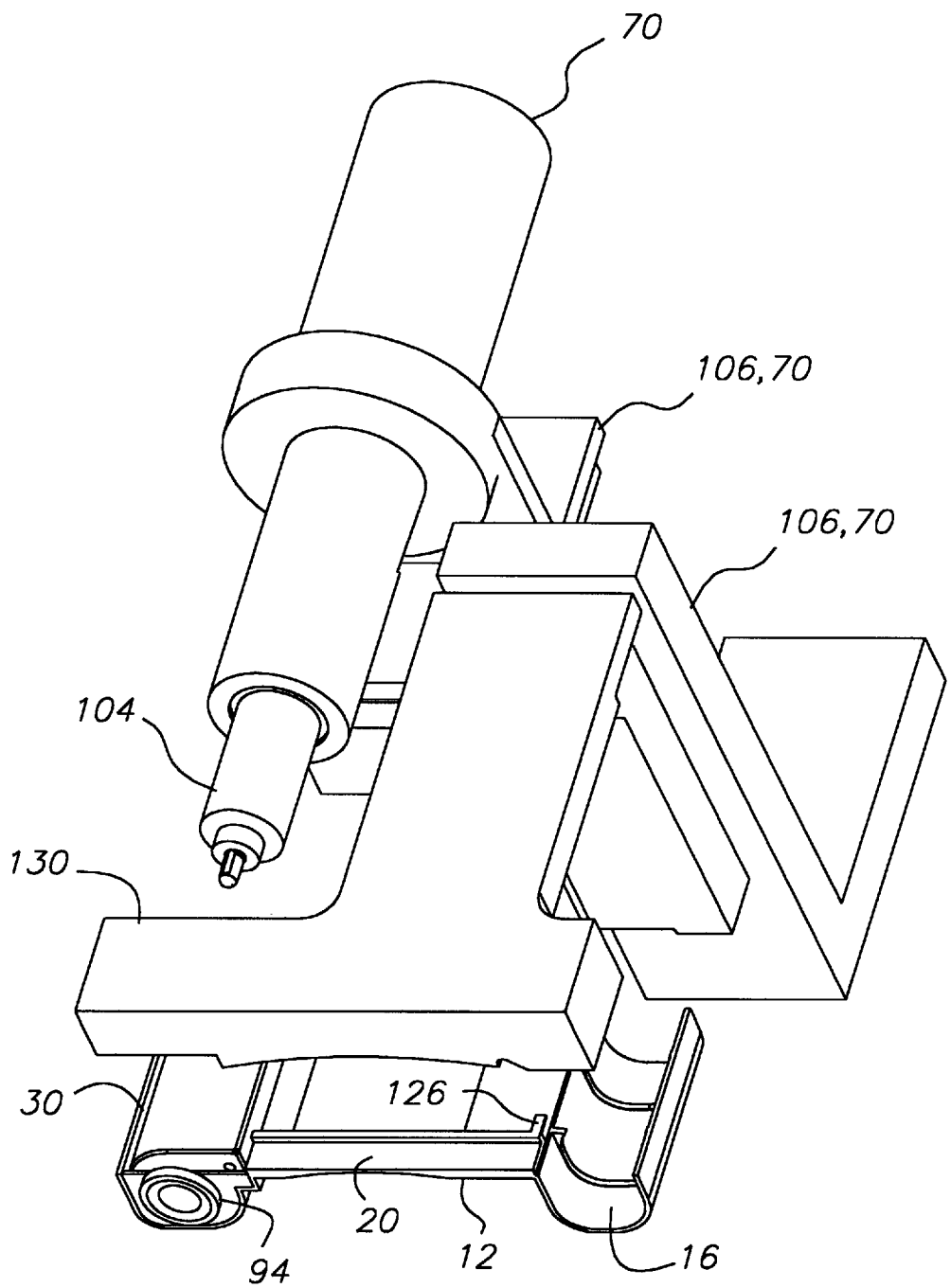
FIG. 12 is the same view as FIG. 8 showing a modified apparatus station including a film guiding member.

Referring now to FIGS. 11–13, next, the quill is driven by the quill motor or actuation mechanism 70 in a forward direction (indicated by arrow 122), rotating the cartridge spool and thrusting a leading portion 38 of the filmstrip 36 from the cartridge 30. This can be most conveniently accomplished at the same assembly station as was used for seating the cartridge. The thrusting of the film can be continued until the free end 40 of the filmstrip 36 is impelled into the supply chamber. A detector 124 can be positioned to sense optically or in some other manner when the free end 40 reaches the supply chamber space 16a and signal the controller (not shown) to stop thrusting.

In a particular embodiment of the invention, the frame assembly has film retention fingers 126, as disclosed in U.S. patent application Ser. No. 08/796,155, entitled "ONE-TIME-USE CAMERA HAVING MAIN BODY PART AND INSERTABLE LIGHT BAFFLE WITH FILM HOLDERS TO FACILITATE CAMERA ASSEMBLY", filed Feb. 6, 1997, by Douglas H. Pearson, which is hereby incorporated herein by reference. The film retention fingers 126 define a film entrance 128 leading into the supply chamber space 16a. In this embodiment a film guiding member 130 directs the free end 40 of the filmstrip 36 through the film entrance 128 and into the supply chamber space 16a. The film guiding member 130 is lowered into position over the intermediate section 20 of the frame assembly 10, by a linear actuator 106, prior to or during film thrusting, at the same station as is used for cartridge seating or at a succeeding station (as shown in FIG. 12). The film guiding member 130 has a concave bottom 132 overlying the intermediate section 20. The film guiding member 130 has pockets 134 which receive the film retention fingers 126 such that the film entrance 128 defined by the film guiding members 126 lies on an ellipse defined by the concave bottom 132 of film guiding member 130. The detector 124 can be conveniently housed in the film guiding member 130.

Referring now particularly to FIGS. 14-20, after the free end 40 of the leading portion 38 of the filmstrip 36 has been advanced to the supply chamber 16, the frame assembly 10 is moved to another station 68. In this station 68, a mandrel or a spool 136 attached to the apparatus 52, is introduced into the supply chamber 16 along with one or, preferably, a plurality of film guides 138. The guides 138 define a substantially cylindrical preliminary film space 140 within the supply chamber 16, centered on the mandrel 136. The preliminary film space 140 has a radius 142, (referred to hereafter a the "preliminary radius 142") that is predetermined by the internal configuration of the film guides 138. The leading portion 38 of the filmstrip 36 is transported into the preliminary film space 140 and curled about the mandrel 136 and a curling axis (indicated by a cross 144 in FIG. 14). The curling axis 144 is disposed within the supply chamber 16 and is, at the time of curling, coextensive with the axis of rotation of the mandrel.

The guides 138 are interposed between the interior wall 146 of the supply chamber 16 and the mandrel 136 and both guide the leading portion 38 of the filmstrip 36 around the mandrel 136 and limit deflection of the filmstrip 36 in directions radial to the common axis of rotation of the mandrel and the curling axis 144. The initial turn (not separately shown) of the filmstrip 36 is cinched to the mandrel 136, the guides 138 are retracted from the supply chamber (in currently preferred embodiments in a direction parallel to the curling axis, and the majority of the filmstrip 36 is wrapped around the initial turn to form a film roll 62 (shown in FIGS. 2 and 3).

The mandrel 136 is preferably a vacuum mandrel, that is, a hollow cylinder perforated on the longitudinal surface by air passages 148 and is connected to a vacuum pump or negative air pressure source (not shown). As the leading portion 38 of the filmstrip 36 curls about the mandrel 136, the vacuum urges the filmstrip 36 into contact with the mandrel 136. The mandrel 136 is rotated about the mandrel axis 150, starting either before or after the free end 40 of the filmstrip 36 contacts the mandrel 136 and the leading portion 38 of the filmstrip 36 is overlapped and cinched against the mandrel 136, after which the main portion 44 of the filmstrip 36 is wound over the first turn of film roll.

Figure 14:
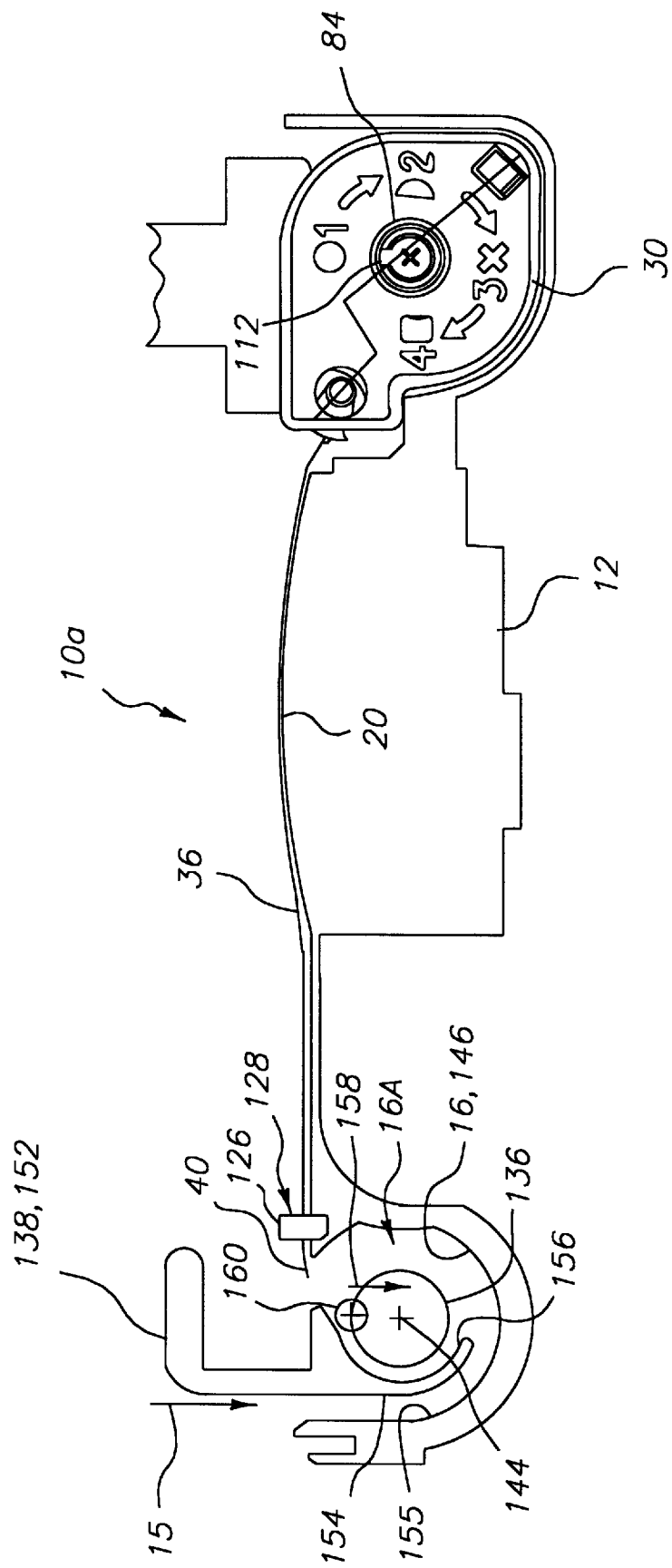
FIG. 14 is a semi-diagrammatical vertical cross-section of a film winding station of another embodiment of the apparatus of the invention, including a camera frame assembly.
Figure 15:
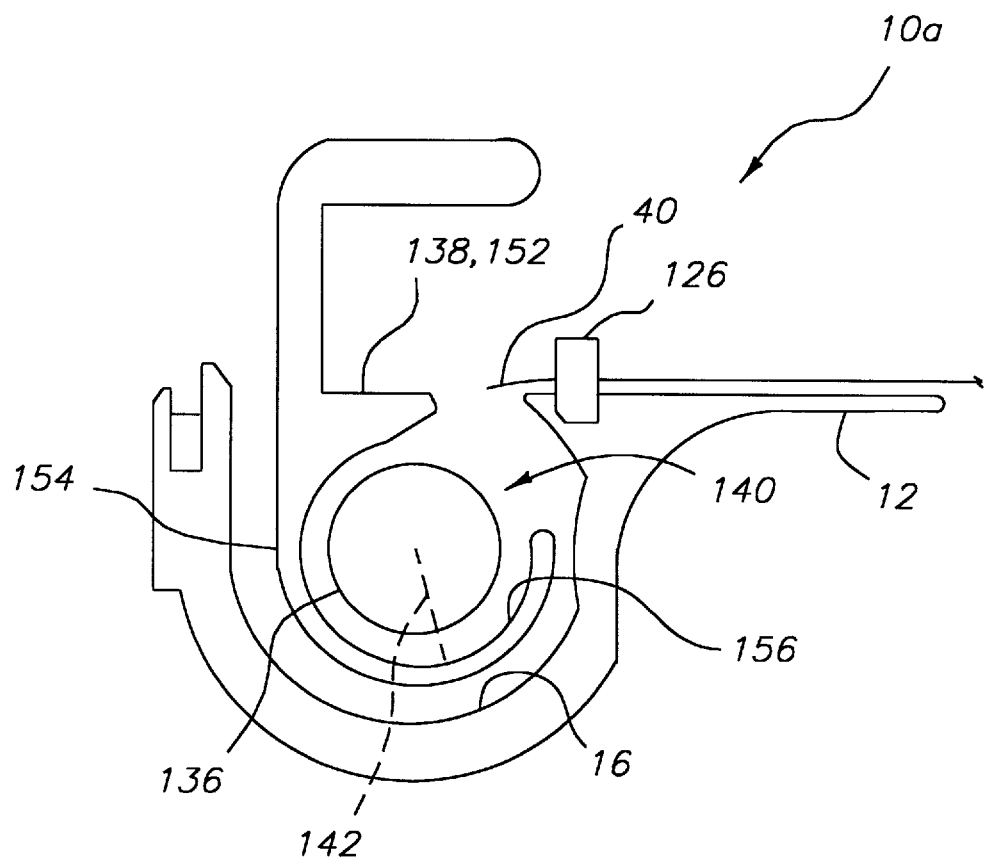
FIG. 15 is a partial enlargement of the same view as FIG. 14 of still another embodiment of the invention.
Figure 16:
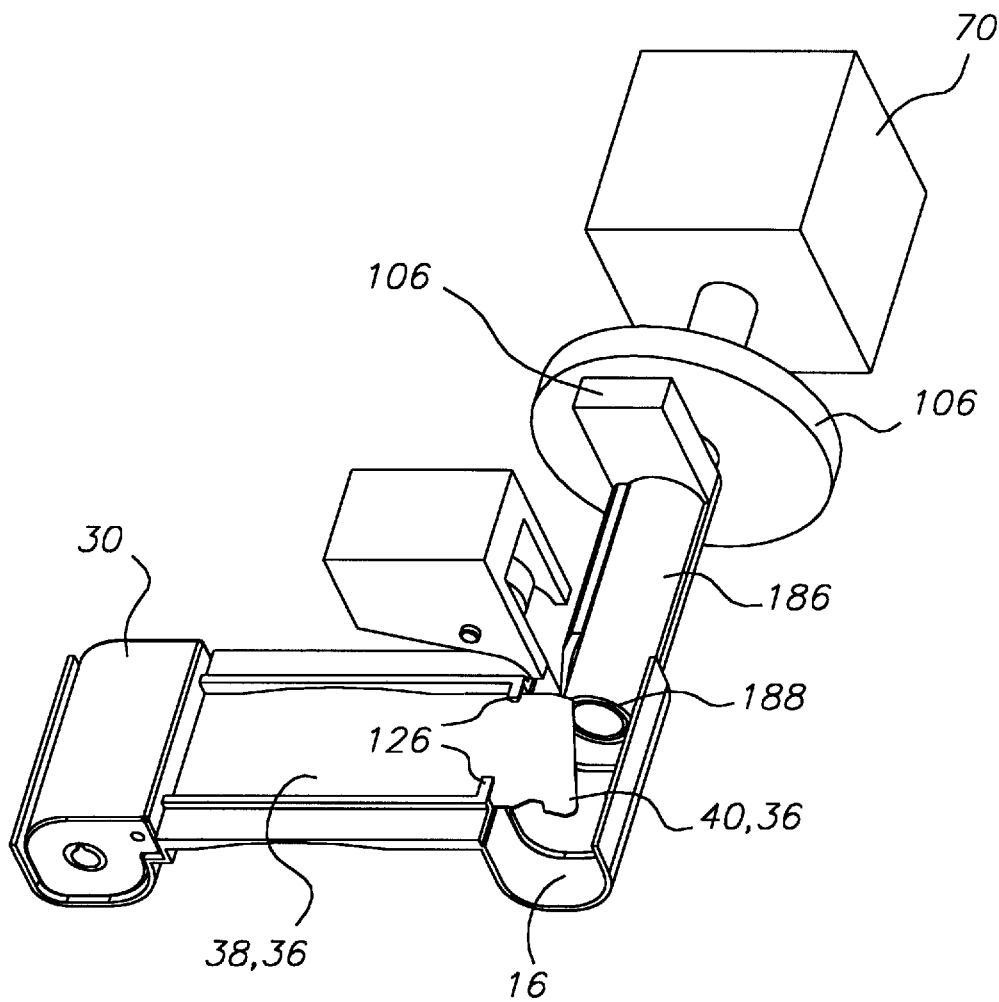
FIGS. 16–19 are semi-diagrammatical perspective views of different stages of film winding in a winding station of the apparatus of FIG. 8.
Figure 17:
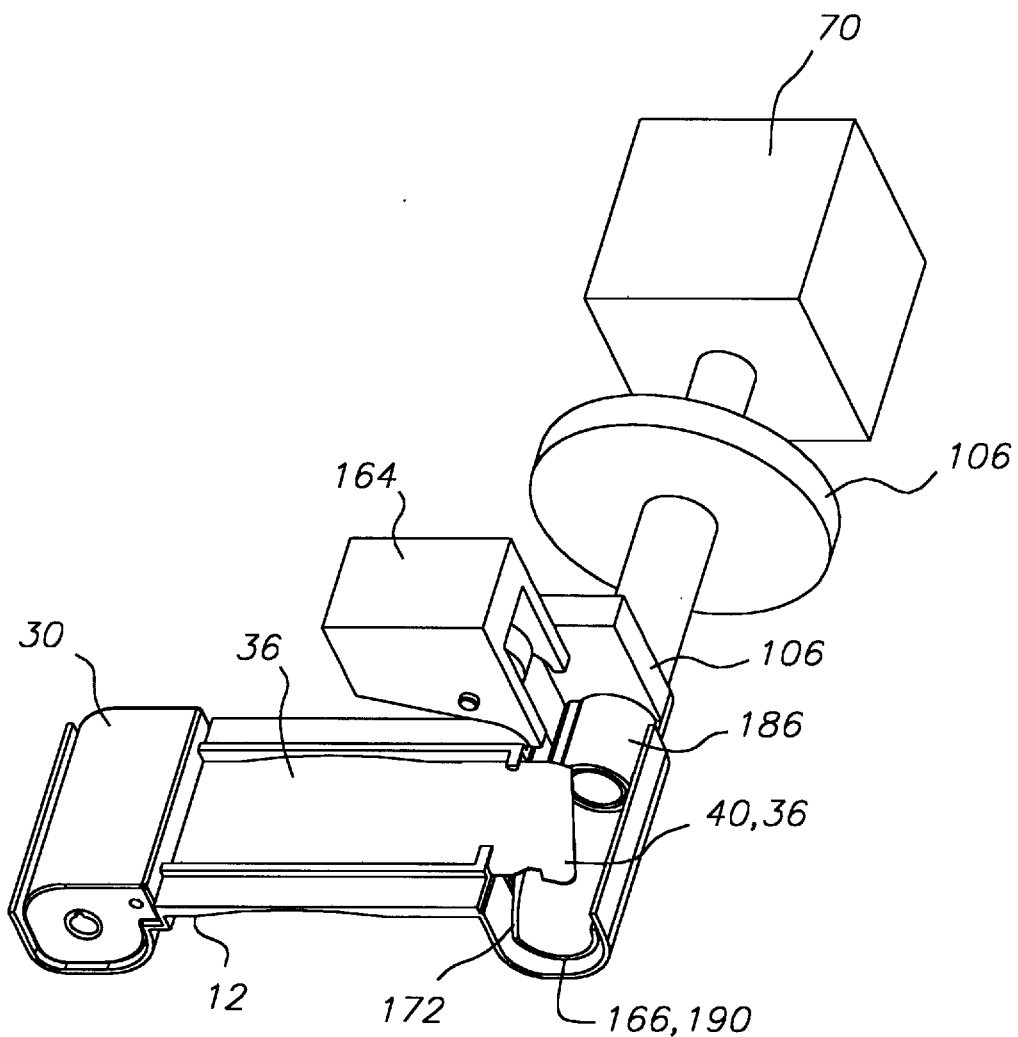
Figure 18:
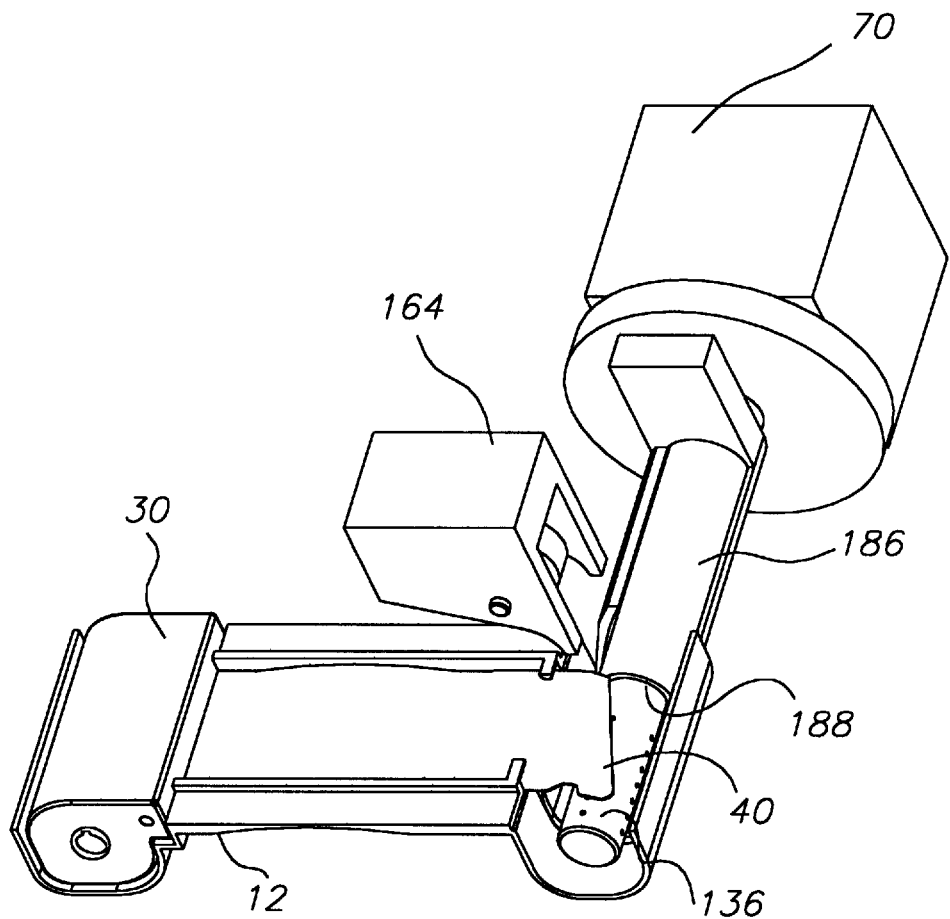
Figure 19:
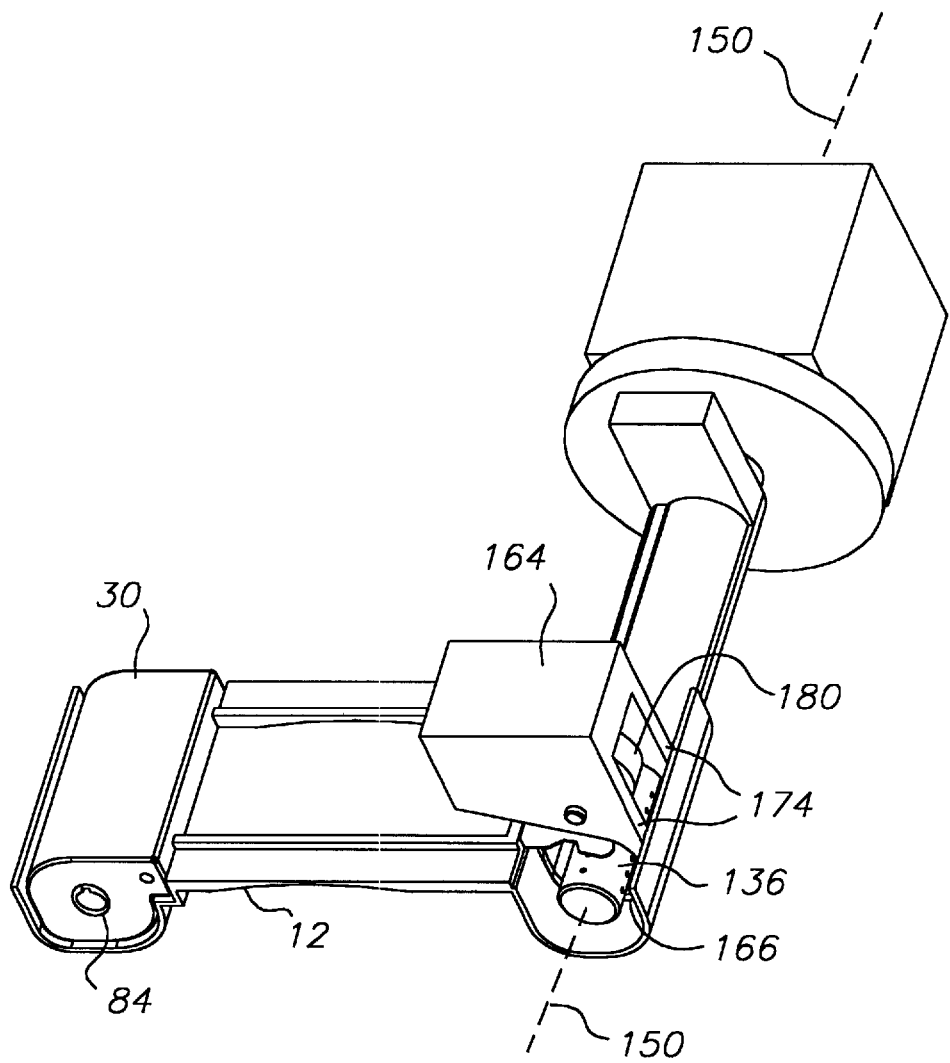

Referring particularly to FIGS. 14–15, the guide or guides 138 can be relatively simple. For example, as shown in FIGS. 14–15, a simple cinch dog 152 having a hook-shaped cross-section can be used. The cinch dog 152 is positioned in the supply chamber 16 with the shank 154 toward the distal side 155 and the opening of the hook 156 facing the direction of entry of the filmstrip 36 into the supply chamber 16. After the filmstrip is cinched, the cinch dog 152 is withdrawn, in an axial direction, from the film chamber 16. In this embodiment, the mandrel 136 can be lowered into the supply chamber 16 during film winding (in the direction indicated by arrow 158 from an alternative curling axis indicated by circled cross 160) so as to continuously maintain tangency between the apex or outermost turn of the film roll and the film entrance 128 or downstream end of the film bridge 86 so as to minimize the force applied to the filmstrip 36 during winding. Thus, in this embodiment, the axis of rotation of the mandrel 136 is moved away from the curling axis 160 during winding, and deeper into the supply chamber 16.

Referring now to FIGS. 16–20, in preferred embodiments of the invention, an assemblage of multiple film guides 138 are used. The multiple guides 138 surround the mandrel 136, in directions radial to the mandrel axis 150, except for an entry 162 through which the filmstrip is admitted. In these embodiments of the invention, the film guides 138 preclude the leading portion 38 of the filmstrip 36 from deflecting in directions radial to the axis 150 of the mandrel beyond a preliminary radius 142 defining the limits of the preliminary film space 140. The leading portion 38 of the filmstrip 36 is thus isolated from the interior wall 146 of the supply chamber 16 as the leading portion 38 is curled about the mandrel 136 and cinched. The mandrel axis 150 and preliminary film space axis are coextensive. The mandrel 136 can be lowered into the supply chamber 16 during film winding to maintain tangency between the outermost turn of the film roll and the section of the filmstrip 36 entering the film supply chamber 16. In particular embodiments, the frame 12 has film retention fingers 126 and the mandrel 136 is kept in a central position within the supply chamber 16 during film winding. The latter approach has the advantage of requiring simpler equipment for moving the mandrel 136. In a particular embodiment, shown in FIGS. 16–20, in which the mandrel 136 is kept in a fixed position, the mandrel 136, preliminary film space 140, and film supply chamber 16 all have a common axis 150.

In this embodiment, the assemblage of guides 138 includes separable upper and lower guides 164,166, respectively. It is preferred that the lower guide 166 is an arcuate partial sleeve or cinch sleeve having a C-shaped cross-section. The partial sleeve 166 has a concave inner surface 168 that is smooth or otherwise configured to present a low frictional load to the filmstrip. The inner surface 168 of the partial sleeve 166 closely adjoins the mandrel 136. In a particular embodiment the separation is a few times the thickness of the filmstrip 36, about 1 mm. The partial sleeve 166 is coaxial or substantially coaxial with the mandrel 136 and extends around more than half (more than 180 degrees) of the interposed mandrel 136. The lower guide 166 has a distal edge 170 that is at least roughly parallel to the mandrel axis 150 and a horizontal diameter of the mandrel 136. The lower guide 166 has a medial edge 172 that is roughly parallel to the mandrel axis 150 and an imaginary horizontal line tangent to the mandrel 136. (Terms "horizontal" and "vertical" and the like, are used herein in a relative sense in which the longest dimension of the frame assembly defines a "horizontal" direction. Actual orientations may vary as desired, taking into account the effect of gravity on loose parts.)

It is preferred that the upper guide 164 is a guide shoe that is movable independent of the partial sleeve 166. The guide shoe 164 has an arm 174 that extends down and closely adjoins or contacts the distal edge 170 of the partial sleeve 166. The arm 174 can be continuous or can be divided into two discontinuous portions as shown in FIGS. 16–20. The arm 174 has a concave, low friction inner surface 176. The arm 174 has a lower edge 178 that meets with the distal edge 170 of the partial sleeve 166 so as to present a guidepath to the filmstrip 36 that is substantially free of discontinuity. The lower edge 178 and distal edge 170 can meet so as to provide a continuous curve, interrupted only by a narrow seam. Alternatively, the lower edge 178 can extend radially inward beyond the distal edge 170 so as to define a guidepath for the filmstrip in which the filmstrip jumps the discontinuity between the edges 78,170. The latter approach has the advantage that slight misalignment errors do not present a risk of gouging the filmstrip.

The guide shoe 164 has a bearing member 180 medial (toward the left in FIG. 20) to the guide shoe arm 174. The bearing member 180 is positioned so as to be separated from the mandrel 136 by a nip 182 when the upper and lower guides 164,166 are in operating position within the supply chamber 16 and the filmstrip 36 is in place between the mandrel 136 and the bearing member 180. The bearing member 180 can be compressible or resiliently mounted such that the nip 182 is at least partially a function of bearing member deflection during use or the bearing member can be a rigidly mounted, incompressible part. The bearing member 180 can be an immobile skid or bushing which the filmstrip slides past. The bearing member 180 can also be a rotary member such as a driven roller or belt or the like, which rotates at the same or a different speed than the mandrel. There are disadvantages in driving the bearing member, however, since relative differences in the speed of the film and the bearing member present a risk of scuffing or other wear on the filmstrip. It is thus preferred that the bearing member be an unpowered rotary member, such as an idler roller 180 that freely rotates with the passage of the filmstrip and presents a low frictional load to the filmstrip. For the same reason, it is preferred that the idler roller 180 rotate about an axis parallel to the axis of the mandrel 150.

The width of the bearing member 180 in a direction parallel to the mandrel axis 150 is not critical, however, a relatively narrow bearing member presents less spatial constraints for other components of the apparatus, ancillary equipment and the like. A convenient width for the bearing member 180 is less than about one-half the width of the filmstrip. In the embodiment of the invention of FIGS. 16–20, the bearing member or idler roller 180 has a width that is about one-quarter of the width of the filmstrip 36.

The idler roller 180 can have a flange (not shown) that extends outward from the rest of the roller radial to the roller axis. The flange can help maintain alignment of the leading portion of the filmstrip and the mandrel by limiting both lateral movement and torqueing of the filmstrip about its longitudinal axis. The flange may be superfluous if the front end of the supply chamber is closed.

Figure 20:
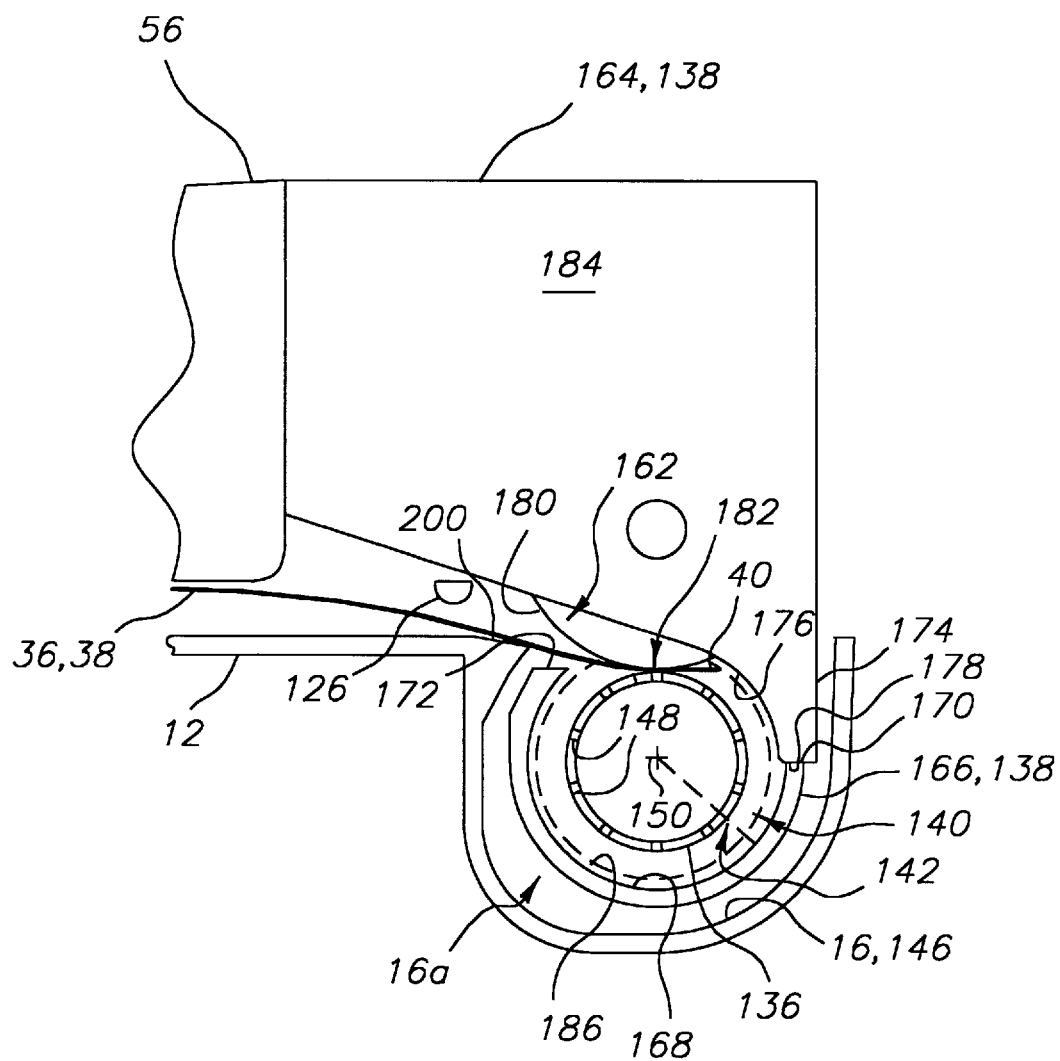
FIG. 20 is a semi-diagrammatical partial cross-sectional view of the winding station of FIGS. 16–19. An optional component 56 is also shown.

The guide shoe 164 includes a support portion 184 that provides physical support for the arm 174 and bearing member 180. For example, the support portion in FIGS. 16–20, carries the axle of the bearing member 180. The support portion 184 is preferably configured so as to avoid any possibility of unintended contact with the filmstrip. As shown in FIG. 20, in particular embodiments of the invention the support portion 184 can be joined to another component 56, such as a film bridge or film guiding member, as a single unit.

The assemblage of guides can include a film stripper 186. The stripper 186 has a shoulder 188 (best seen in FIG. 18) that defines a lateral boundary for the film roll. The stripper 186 can have a dimension in directions radial to a stripper axis, that is smaller, the same as, or larger than the dimensions of the supply chamber in the same directions. In a particular embodiment of the invention, the stripper 186 is a complete sleeve that is coaxial with the mandrel 136 and is separated from the mandrel 136 by less than the thickness of the filmstrip 36 and, preferably, about one-half the thickness of the filmstrip. In this embodiment, the dimensions of the stripper 186 in directions radial to the stripper axis (which is coextensive with the mandrel axis 150), are less than the dimensions of the preliminary film space 140 in the same directions and the partial sleeve 164 is coaxial with the stripper 186. This permits the mandrel 136, partial sleeve 164, and the stripper 186 to move along a common axis, independent of each other and without interference; and, at the same time, keeps overall apparatus and supply chamber dimensions small.

Figure 2:
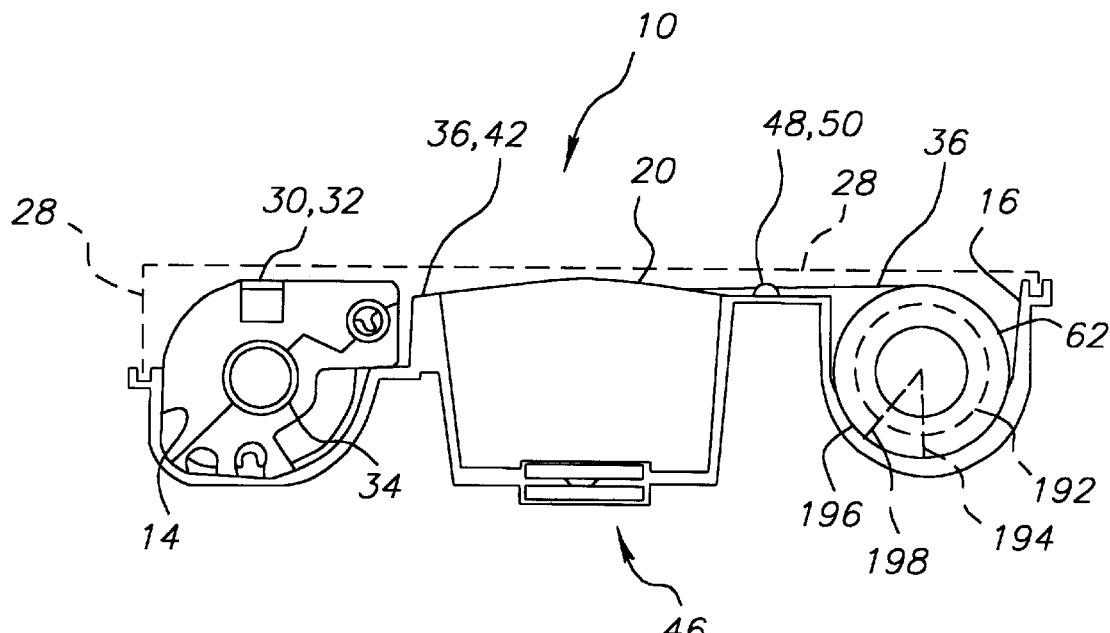
FIG. 2 is the same view of the camera frame assembly as shown in FIG. 1, after the winding of the film roll.
Figure 3:
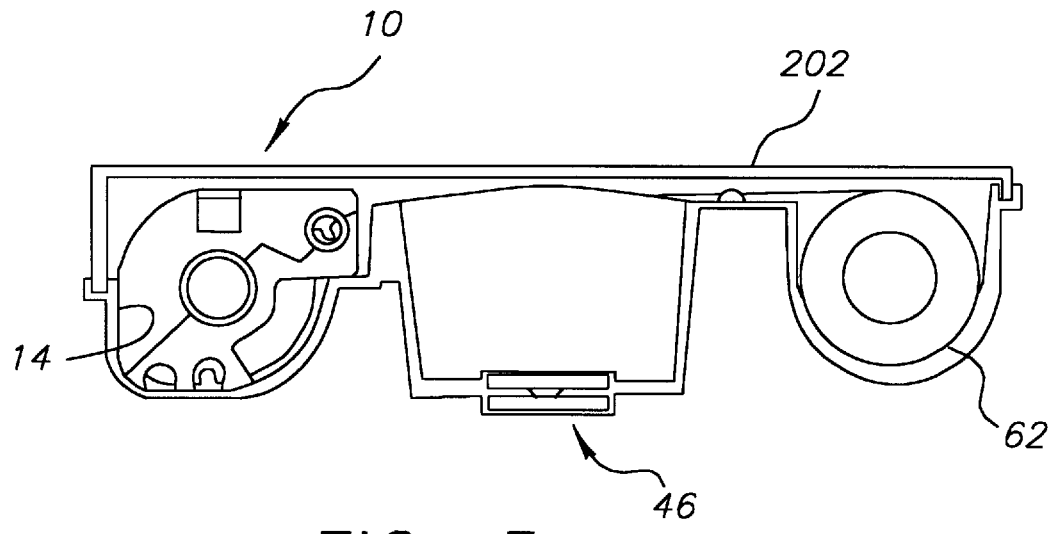
FIG. 3 is the same view of the camera frame assembly as shown in FIG. 2, after installation of the back cover closing the rear opening.

In the embodiment of the invention shown in FIGS. 16–20, the guide assemblage is utilized in the following manner. The leading portion 40 of the filmstrip 36 is advanced into the supply chamber 16 until the free end 40 is detected by a sensor (not illustrated in these figures) which can be mounted in the guide shoe 164. The stripper 186 is then moved by a linear actuator 106 toward the supply chamber until the shoulder 188 of the stripper 186 contacts the edge of the filmstrip 36. The stripper 186 is then stopped. The partial sleeve 166 is then moved along the stripper 186 and into the supply chamber 16. The medial edge 172 of the partial sleeve 166 is preferably chamfered from a forward end 190 toward the base of the sleeve. As the partial sleeve 166 is extended into the supply chamber 16, the free end 40 of the filmstrip 36 is lifted by a distance sufficient to avert the free end clear the mandrel 136, when the mandrel 136 is extended into the chamber. The mandrel 136 is then extended into the supply chamber 16. The rotation of the mandrel 136 is initiated and the vacuum source is switched on, when the mandrel 136 has entered the supply chamber 16 or before. The guide shoe 164 is then lowered relative to the supply chamber site 16a until the guide shoe 164 contacts the partial sleeve 166 and the predetermined nip 182 is defined between the idler roller 180 and the mandrel 136. As this occurs, the free end 40 of the filmstrip 36 is directed into the nip 182. (The free end 40 of the filmstrip is illustrated as being partially cut back to form an angled tip. This is a typical film feature, but is not a mandatory requirement for the method and apparatus of the invention.) The mandrel 136 continues to rotate. The idler roller 180 pinches the leading portion 38 of the filmstrip 36 against the mandrel 136 and the vacuum pulls the filmstrip 36 radially toward the mandrel axis 150. After about one and one-half revolutions, the leading portion 38 of the filmstrip 36 is cinched onto the mandrel 136. A vacuum sensor (not shown) positioned in the vacuum line detects the drop in air flow or decrease in air pressure resulting from the cinching. The vacuum sensor signals a control, which in response withdraws the guide shoe 164 and partial sleeve 166. The main portion 44 of the filmstrip is then pulled into the chamber 16 by the mandrel 136 and wound over the leading portion producing the film roll 62. Referring now to FIG. 2, the film roll 62 has an outermost turn 192 (indicated in FIG. 2 by a dashed line) that defines a first film roll radius 194 that is larger than the preliminary radius 142.

Winding of the film roll continues until the main portion 44 of the filmstrip 36 has reached the film roll 62. This is ordinarily the major portion of the filmstrip. The trailing portion 42 of the filmstrip necessarily remains attached to the spool 84 of the film cartridge 30 and extends to the film roll 62. The rotation of the mandrel 136 is stopped before an excessive strain is placed on the trailing portion 42. This may be done in a variety of ways. For example, a sensor can detect an increased load on the mandrel due to reaching the trailing portion; or a detector can count rotation of the film spool or another rotating part; or a detector can track the length or area of filmstrip traveling to the film roll; or film can be wound for a predetermined time. With any of these approaches a slip clutch can be provided in the mandrel to accommodate excessive strain.

After winding is completed, the mandrel 136 is removed from the film supply chamber. The vacuum is first turned off and compressed air of other gas may be blown back through the mandrel 136 to encourage release of the film roll. At this time, the mandrel 136 can be rotated backwards a revolution or so to further encourage the film roll to release. The combination of these effects allows the film roll to loosen and expand such that the outermost turn 196 defines a second film roll radius 198 larger than the first film roll radius 194. In a preferred embodiment of the invention, the film roll does not expand substantially beyond the throat 17 of the supply chamber 16. This can be accomplished in different ways. For example, the supply chamber can include a vacuum port (not shown) through which a vacuum can be applied to the film roll in the manner disclosed in U.S. Pat. No. 5,608,482, which is hereby incorporated herein by reference. The frame 12 can alternatively have wedges 200 at the medial margin of the throat 17, that narrow the throat to a width less than the width of the widest portion of the supply chamber 16 and thus limit clock-springing of the film roll.

The mandrel 136 is next removed from the supply chamber by retracting the mandrel into the stripper 186, while leaving the stripper 186 in place against the edge of the filmstrip 36. Because the radial gap between the mandrel 136 and stripper 186 is less than the thickness of the filmstrip 36, telescoping is at least substantially prevented.

In a currently non-preferred embodiment, the mandrel is detachable from the apparatus in the manner of a spool. Although the spool can be relatively simple this still adds an additional part to the camera and the complexity of a release mechanism for detaching the spool.

In an embodiment in which a film bridge 86 is used, the film bridge 86 is displaced relative to the camera frame assembly 10, prior to removal of the mandrel 136; so slack in the filmstrip 36 can be taken up by rolling a final portion of the filmstrip onto the film roll or retracting that part of the filmstrip back into the cartridge 30.

The rear opening 28 of the camera frame assembly 10 is next closed and the camera frame assembly is rendered light-tight. This can be a single step in which a light-tight back 202 is attached to the frame 12 or can involve multiple steps. For example, a back can be attached over the rear opening followed by the plugging of a bottom opening to render the assembly light-tight. The resulting camera assembly of the invention can be a completed camera or can be a camera subunit requiring additional assembly operations for completion. In addition to the features already discussed, including a film cartridge and film roll, the camera assembly of the invention can also include other conventional camera features well known to those of skill in the art.

The invention has been described in detail with particular reference to certain preferred embodiments thereof, but it will be understood that variations and modifications can be effected within the spirit and scope of the invention.

PARTS LIST camera frame assembly 10
camera frame 12
cartridge chamber 14
supply chamber 16
throat or opening 15,17
side openings 18
intermediate section or exposure frame 20
concave interior wall 22
film space 24
film space axis 26
rear opening or rear accessway 28
film cartridge 30
canister 32
spool 34
filmstrip 36
leading portion 38
free end 40
tail portion or trailing portion 42
main portion 44
exposure system 46
camera film drive 48
film engagement member 50)
apparatus 52
receiver 54
active components 56
loading position 58
film roll 62
pallet or nest 64
positioner 66
stations 68
actuation mechanism 70
non-use position 72
use or active position 74
cartridge mover 76
vacuum gripper 78
active light lock opener 80
spool rotator 82
spool 84
film bridge 86
friction reducing features 87
film path 88
vacuum-compressed gas unit 89
belt 90
belt drive 91
idler rollers 92
thumbwheel 94
endwall 96
rotation member 98
thumbwheel drivekey 100
axial cut-out or engagement portion 102
cartridge nest 103
quill 104
linear actuator 106
arrow 108
slot 109
quill drivekey 110
detent or key member 111
second cut-out or engagement portion 112
body 113
clamping member 114
arrow 115
thumbwheel and cartridge axes 116,118
detector 120
arrow 122
detector 124
film retention fingers 126
film entrance 128
film guiding member 130
bottom 132
pockets 134
mandrel or spool 136
film guides 138
preliminary film space 140
preliminary radius 142
curling axis 144
interior wall 146
air passages 148
mandrel axis 150
cinch dog 152
shank 154
distal side 155
hook 156
arrow 158
alternative curling axis 160
entry 162
upper guide or guide shoe 164
lower guide or partial sleeve 166
inner surface 168
distal edge 170
medial edge 172
arm 174
inner surface 176
lower edge 178
bearing member or idler roller 180
nip 182
support portion 184
stripper 186
shoulder 188
forward end 190
outermost turn 192
first film roll radius 194
outermost turn after release 196
second film roll radius 198
wedges 200
back 202

What is claimed is:

1. A method for loading a cartridge in a camera frame assembly, comprising the steps of:

providing a frame assembly including a frame having a cartridge chamber, a supply chamber, and an intermediate section between said chambers, said frame assembly including a thumbwheel attached in freely rotatable relation to said frame, said thumbwheel having a rotation member disposed external to said cartridge chamber and a drivekey extending axially into said cartridge chamber;

positioning a film cartridge in said cartridge chamber in close axial proximity to said thumbwheel drivekey, said film cartridge including a spool and a filmstrip, said spool having opposed first and second ends, each said end having a spool engagement portion, said spool engagement portion of said first end being complementary in shape to said thumbwheel drivekey, said filmstrip having an leading portion, a main portion and a tail portion;

placing a quill drivekey in close axial proximity to said second end of said spool, said quill drivekey being complementary in shape to said spool engagement portion of said second end;

clamping said thumbwheel in immobile relation to said frame;

rotating said quill drivekey;

during said rotating, urging said quill drivekey axially toward said cartridge and said cartridge toward said thumbwheel drivekey until said drivekeys mate engagingly with respective said engagement portions of said spool.

2. The method of claim 1, following said rotating, releasing said thumbwheel.

3. The method of claim 2 further comprising, following said releasing, thrusting said leading portion of said filmstrip to said supply chamber.

4. The method of claim 3 further comprising lowering a film guiding member over the intermediate section of said frame prior to said rotating.

5. The method of claim 1 further comprising lowering a film guiding member over the intermediate section of said frame prior to said rotating.

6. The method of claim 1 wherein said engagement portions are axial cut-outs.

7. The method of claim 1 wherein said rotating is in a rewind direction for said film cartridge.

8. The method of claim 1 further comprising opening an active light lock prior to said positioning step.

9. The method of claim 1 further comprising, following said urging step, advancing said leading portion of said filmstrip to said supply chamber.

10. The method of claim 9 wherein said advancing further comprises thrusting said leading portion of said filmstrip to said supply chamber.

11. An cartridge loading apparatus, for use with a camera frame assembly including a frame having a cartridge chamber, a supply chamber, and an intermediate section between said chambers, said frame assembly including a thumbwheel attached in freely rotatable relation to said frame, said thumbwheel having a rotation member disposed external to said cartridge chamber and a drivekey extending axially into said cartridge chamber; and a film cartridge disposed in said cartridge chamber, said film cartridge including a case, a spool, and a filmstrip, said spool having opposed first and second ends, each said end having a spool engagement portion, said spool engagement portion of said first end being complementary in shape to said thumbwheel drivekey, said filmstrip having an leading portion, a main portion and a tail portion; said apparatus comprising:

a receiver for the camera frame assembly, said receiver defining sites for said chambers and said intermediate section, and a cartridge chamber axis;

a clamping member movable between a non-use position disposed in spaced relation to said frame and a use position wherein said clamping member bears against said thumbwheel and prevents rotation of said thumbwheel relative to said frame;

a cartridge mover disposed in operative relation to said receiver, said cartridge mover being movable over said cartridge chamber site to place said cartridge in said cartridge chamber wherein said engagement portion of said first end of said spool is disposed in close proximity to said drivekey of said thumbwheel; and a quill having a drivekey complementary in shape to said engagement portion of said second end of said spool, said quill having an axis of rotation, said quill being reversibly movable along said axis of rotation toward said cartridge chamber to urge said cartridge toward said thumbwheel and matingly engage said drivekeys and respective said engagement portions.

12. The apparatus of claim 11 further comprising a film guiding member disposable over said intermediate section site.

13. The apparatus of claim 11 further comprising an active light lock opener disposed in proximity to said cartridge mover.

14. The apparatus of claim 13 wherein said quill is rotatable in two opposed directions for thrusting film from said cartridge and rewinding film into said cartridge.

\* \* \* \* \*